(12) United States Patent
Smajlovic et al.

(10) Patent No.: US 9,446,667 B2
(45) Date of Patent: Sep. 20, 2016

(54) CHARGING AN ELECTRIC VEHICLE AND AIR CONDITIONING OF THE VEHICLE INTERIOR

(75) Inventors: Nordin Smajlovic, Ottobrunn (DE); Alexander Meijering, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1099 days.

(21) Appl. No.: 13/552,257

(22) Filed: Jul. 18, 2012

(65) Prior Publication Data
US 2013/0020864 A1 Jan. 24, 2013

(30) Foreign Application Priority Data

Jul. 19, 2011 (DE) .................... 10 2011 079 415

(51) Int. Cl.
| | |
|---|---|
| B60L 1/00 | (2006.01) |
| B60L 1/04 | (2006.01) |
| B60H 1/00 | (2006.01) |
| H02J 1/14 | (2006.01) |
| H02J 7/00 | (2006.01) |

(52) U.S. Cl.
CPC ............. B60L 1/04 (2013.01); B60H 1/00428 (2013.01); B60H 1/00657 (2013.01); *B60L 2240/34* (2013.01); *B60L 2250/14* (2013.01); *H02J 1/14* (2013.01); *H02J 7/0068* (2013.01)

(58) Field of Classification Search
CPC ............................ B60H 1/00657; B60L 1/04
See application file for complete search history.

(56) References Cited

U.S. PATENT DOCUMENTS

| 5,432,026 A | 7/1995 | Sahm et al. |
| 5,467,006 A * | 11/1995 | Sims ............................. 237/5 |
| 6,626,003 B1 | 9/2003 | Kortuem et al. |
| 2004/0194479 A1 | 10/2004 | Umebayashi et al. |
| 2009/0064696 A1 | 3/2009 | Perkins |
| 2010/0206957 A1* | 8/2010 | Vyas et al. ................. 236/46 R |
| 2010/0235046 A1* | 9/2010 | Proefke et al. ................ 701/36 |
| 2011/0043165 A1 | 2/2011 | Kinser et al. |
| 2011/0046828 A1* | 2/2011 | Chander et al. ............... 701/22 |

FOREIGN PATENT DOCUMENTS

| DE | 43 37 978 A1 | 6/1994 |
| DE | 43 09 621 A1 | 9/1994 |
| DE | 10 2004 004 302 A1 | 8/2004 |

(Continued)

OTHER PUBLICATIONS

German Office Action dated Jan. 18, 2013 with English translation (eleven (11) pages).

(Continued)

*Primary Examiner* — Jared Fureman
*Assistant Examiner* — Joel Barnett
(74) *Attorney, Agent, or Firm* — Crowell & Moring LLP

(57) ABSTRACT

A method is provided for charging an electric vehicle with an electric energy accumulator and for stationary mode air conditioning the vehicle interior by way of an electric air conditioning system. The electric energy accumulator is charged to a minimum state of charge. After the energy accumulator has reached the minimum state of charge, the interior is air conditioned in such a way that at an assumed departure time a preset air conditioning state of the interior is reached. The energy accumulator is charged to a target state of charge with any excess energy that is not required to reach the air conditioning state.

13 Claims, 4 Drawing Sheets

(56) References Cited

FOREIGN PATENT DOCUMENTS

| DE | 103 26 596 | A1 | | 11/2004 |
|---|---|---|---|---|
| DE | 10 2008 037 307 | A1 | | 3/2009 |
| DE | 10 2009 019 607 | A1 | | 11/2010 |
| DE | 10 2009 022 300 | A1 | | 11/2010 |
| DE | 102009019607 | A1 | * | 11/2010 |
| DE | 10 2010 036 994 | A1 | | 2/2011 |
| DE | 10 2010 034 105 | A1 | | 4/2011 |
| EP | 1 024 038 | A2 | | 8/2000 |
| FR | 2 941 199 | A1 | | 7/2010 |

OTHER PUBLICATIONS

Owner's Manual of Nissan LEAF, http://www.nissanleafwelcomepackuk.com/download/omgb.pdf (Two hundred and thirty-eight (238) pages).

German Search Report dated Dec. 27, 2011 including partial English-language translation (Ten (10) pages).

* cited by examiner

CHARGING AN ELECTRIC VEHICLE AND AIR CONDITIONING OF THE VEHICLE INTERIOR

CROSS-REFERENCE TO RELATED APPLICATION

This application claims priority under 35 U.S.C. §119 from German Patent Application No. DE 10 2011 079 415.8, filed Jul. 19, 2011, the entire disclosure of which is herein expressly incorporated by reference.

BACKGROUND AND SUMMARY OF THE INVENTION

The invention relates to a method for charging an electric vehicle and for air conditioning the vehicle interior.

In this context the term electric vehicle is understood to mean hereinafter not only the classical electric vehicles, but also electric vehicles with range extender as well as plug-in hybrid vehicles.

When an electric drive is used, the air conditioning of the vehicle interior—in particular, the cooling—can take place independently of operating the drive. Electric vehicles typically use an electric air conditioning system, which includes one or more electric powered consumers, for example an electric refrigerant compressor in the refrigerant circuit and/or an electric heater for heating the interior air. In contrast, the refrigerant compressor in conventional motor vehicles that are driven by an internal combustion engine are mechanically driven typically by way of the drive train; and a heat exchanger, which is heated by the heat of the cooling fluid, is used as the heater. It is also known from the prior art that motor vehicles that are driven by an internal combustion engine have stationary mode heating units; these stationary mode heating units are generally driven by burning the fuel contained in the tank.

The use of an electric air conditioning system makes it possible to provide stationary mode air conditioning functions independently of the operating state of the drive. For example, it can be provided that at the time of departure the vehicle has an air conditioning state that is comfortable for the vehicle user—in particular, a certain desired temperature—by suitably cooling (or heating).

In order to charge an electric vehicle, the vehicle is coupled to an electric energy supply by such means as a charging cable or by way of inductive coupling. If, on coupling the vehicle to an electric energy supply, the electric vehicle is not only charged, but also air conditioned in a parked position, then less energy is available for charging the electric vehicle when the electric grid power is limited (for example, 3.68 kW when charging at a standard socket having a single phase grid voltage of 230 V). With a limited charging time, the improved air conditioning may cause the state of charge to degrade at startup and, hence, result in a reduction in the cruising range of the electric vehicle. Although under some circumstances this drawback can be compensated by increasing the charging time, an increase in the charging time is often not possible given a respective time limitation. Pre-air conditioning the vehicle interior prior to departure not only improves the comfort of the vehicle user, but it also makes sense in terms of energy, because a subsequent activation of the air conditioning function after the departure is associated with a reduction in the cruising range. In that case then the limited energy from the electric energy accumulator of the electric vehicle has to be used for the air conditioning function.

Consequently, the demands for a high degree of air conditioning comfort, a long cruising range and a short charging time can be coordinated only with difficulty.

The object of the present invention is to provide a suitable method for charging the electric vehicle and for air conditioning the electric vehicle in stationary mode.

One aspect of the invention relates to a method for charging an electric vehicle with an electric energy accumulator and for stationary mode air conditioning the vehicle interior by use of an electric air conditioning system. In this case the vehicle is coupled to an electric energy supply by such means as a charging cable or by way of an inductive coupling, so that the electric energy can be received from the electric energy supply.

According to the method, the electric energy accumulator, for example a lithium ion battery, is charged to a minimum state of charge, for example a minimum SOC (state of charge) in the range between 40% and 70%, for example, 50%. After the energy accumulator has reached the minimum state of charge, the interior is air conditioned (for example, by cooling or heating) in such a way that at an assumed departure time a preset air conditioning state of the interior is reached. For example, a certain target temperature (for example, 22° C.) or a certain target temperature window (for example, 20° C. to 24° C.) is reached. However, this situation is possible only if there is still enough energy available between the time that the air conditioning is initiated and the time of departure to achieve this goal, for example when the time period prior to the assumed departure time is still adequately long.

The assumed departure time can have been manually entered, for example, by the vehicle user or can have been determined autonomously by the vehicle, for example, based on the vehicle itinerary history. For example, the next departure time can be estimated as a function of the current day of the week and/or the current time, because the vehicle knows from the itinerary history on which day of the week and/or at what time the vehicle is typically put into service.

The energy accumulator is charged to a target state of charge (for example, 97% SOC) with the excess energy that is not required to reach the desired air conditioning state, provided that excess energy is available. After reaching the minimum state of charge, the energy accumulator can be subsequently charged, for example, in parallel at the same time as the air conditioning.

According to the method, the charging measure is executed, for example, until the minimum state of charge. On reaching the minimum state of charge, a pre-air conditioning of the interior is executed immediately or later in such a way that a certain air conditioning state is reached at the time of departure. If there is still enough excess power available, the charging operation is continued, for example, in parallel. This does not necessarily mean that the pre-air conditioning starts immediately on reaching the minimum state of charge. The pre-air conditioning can also start at a later point-in-time (for example, 30 minutes prior to the assumed departure time), if it can still be achieved that the interior is adequately pre-air conditioned at the time of departure. On reaching the minimum state of charge, a pre-air conditioning of the interior is given priority over reaching the target state of charge in such a way that, for example, power for charging to the target state of charge may be used on such a scale prior and parallel to the pre-air conditioning, provided that complete pre-air conditioning can be ensured at the time of departure.

Therefore, in the event that both the charging time and charging power are limited, the method according to the invention enables a prioritization in such a way that the charging of the energy accumulator to a certain state of charge has a high priority. Lower priority is given to providing an air conditioning state at the time of departure, that is, the pre-air conditioning of the vehicle interior. However, the pre-air conditioning of the vehicle interior has higher priority than reaching a target state of charge for the energy accumulator.

The method according to the invention makes it possible to significantly improve the comfort by providing a desired air conditioning state at the time of departure. The improved comfort relates to both the high degree of comfort when boarding and also the comfort during the trip and is in general not just limited to the climate, but rather also relates to the acoustics (low noise level during the trip, because the pre-air conditioning allows the air conditioning system to run at a lower output during the trip). In contrast, when the charging time is limited and the grid power is low, a suitable choice of the minimum state of charge results in a cruising range that is only slightly reduced. In most cases a potential decrease in the absolute cruising range that is associated with the fulfillment of the air conditioning request and that is due to the possibly smaller charge cycle (charge cycle=difference between the state of charge at the time of departure and the state of charge at the start of charge) can be ignored and is noticeable—if at all—only when the energy accumulator is totally run down (however, it is seldom the case that the energy accumulator is totally run down). Therefore, the air conditioning of the interior can be guaranteed in essence independently of the surrounding conditions and the state of charge. Furthermore, in the event that the interior is pre-air conditioned, the cruising range is similar to or insignificantly less than the cruising range in the event that the interior is air conditioned exclusively after the vehicle startup.

Preferably on reaching the minimum state of charge it is checked whether the time period prior to the assumed departure time has reached or dropped below a defined time period threshold. In this case the air conditioning of the interior is started. For example, it is checked whether the time period prior to the departure time is less than $\Delta t=30$ minutes. The time period threshold is, for example, greater than or equal to the time period that is maximally required to achieve a preset air conditioning state under normal conditions. The time period threshold can be constant or variably adjustable, for example, as a function of the temperature prior to activating the air conditioning system, a target temperature for the time of departure and/or as a function of the available grid power (for example, 3.68 kW at a standard power supply or 19.2 kW at a high power supply).

It is advantageous, if while air conditioning the interior, the energy accumulator is charged at least intermittently in parallel with the excess energy that is not required to reach the air conditioning state. For example, both the interior can be air conditioned and the energy accumulator can be charged in a period directly preceding the time of departure. This strategy has the advantage that the time period, in which the basic power of the vehicle electrical system that is obtained independently of the actual air conditioning function and independently of the actual charge function, is reduced as compared to the situation, in which first the energy accumulator is charged and then only the air conditioning system runs without the energy accumulator being charged.

In certain situations it is advantageous to use the energy from the energy accumulator to air condition the interior, for example, when there is inadequate grid power. As a result, both the power from the electric energy supply and the power from the energy accumulator can be used simultaneously for air conditioning. For example, it can be checked whether the power made available by the energy supply for air conditioning the interior is adequate to reach the desired air conditioning state in the interior at the assumed departure time. For example, it can be checked whether the power of the energy supply is less than a required power value for the air conditioning. If this is the case, then stored energy is additionally retrieved from the energy accumulator for the air conditioning of the interior. When energy from the energy accumulator is used for pre-air conditioning, the state of charge can fall below the minimum state of charge under some circumstances.

This feature is especially advantageous under extreme outdoor conditions and low grid power and makes it possible to guarantee the desired air conditioning state at the start of a trip even in such cases.

The energy accumulator should not reach or exceed a certain temperature (for example, 32° C.), at which or rather above which the energy accumulator may run the risk of being, for example, damaged. In order to prevent such damage, the energy accumulator is typically cooled, in general also during the trip.

Preferably the energy accumulator is reduced to such a temperature at the assumed departure time that during an assumed trip (for example, at an average trip duration of 45 minutes), the cooling does not have to be activated, because an upper operating temperature limit, at which or above which the cooling of the energy accumulator would be activated, is not reached or not exceeded. The energy accumulator is reduced, for example, to such a temperature at the assumed departure time that at the assumed departure time plus an assumed temperature rise during the trip, the temperature remains below an upper operating temperature limit of the energy accumulator, or this upper operating temperature limit is not exceeded.

The pre-conditioning of the energy accumulator takes place prior to the assumed departure time preferably in such a manner that the temperature at the departure time is less than an upper operating temperature limit (for example, 32° C.), at which or above which the cooling of the energy accumulator would be activated, by at least 5° C., in particular by a value in the range of 7° to 22°.

For example, the same trip can always be assumed (for example, a trip of 45 minutes); as an alternative, a trip can be estimated based on the vehicle itinerary history.

The additional cooling of the energy accumulator makes it possible to avoid an energy consumption for cooling the high voltage accumulator during the assumed duration of the trip. This strategy makes it possible to extend in general the cruising range of the electric vehicle. If the trip lasts longer than assumed, then the energy consumption for the cooling is at least reduced.

Preferably the minimum state of charge or a related state of charge (for example, a lower state of charge, which lies below the minimum state of charge by a defined difference and which is not undershot even if the energy accumulator is discharged for pre-air conditioning purposes) is variably adjustable, for example, by way of a user input or by means of an automatic adjustment on the part of the vehicle. For example, the vehicle can evaluate the vehicle itinerary history and, in so doing, determine that, based on the past trips, a certain state of charge will basically suffice to complete the next trip. As an alternative or in addition, information about the upcoming trip can be derived by way of a look-ahead process. Then with this information about the upcoming trip a certain state of charge, which suffices for the upcoming trip, can be determined. For example, a destination can be entered by way of the navigation device in the vehicle (for example, when parking the vehicle); and a minimum state of charge or a related state of charge is adjusted as a function of this information. As an alternative, the next trip can be planned by specifying the destination by way of a data processing device that is located outside the vehicle, for example at home by means of a PC; and the minimum state of charge or a related state of charge can be adjusted as a function of this information.

The minimum state of charge can be decreased with respect to a specified value by individualization of the minimum state of charge—be it by way of a historical evaluation or look-ahead processes. The result of this approach is that at a given time and power for charging and pre-air conditioning, less time is required for charging to the minimum state of charge and that under some circumstances the air conditioning of the interior can start earlier, if desired.

Preferably it is provided that after the passage of the assumed departure time without a vehicle startup, the interior continues to be air conditioned for a certain run-on period (for example, for 30 minutes). This feature covers the not unusual situation, in which the driver reaches the vehicle somewhat later. As an alternative or in addition, the run-on time can be used to execute and/or complete one or more non-executed or incomplete measures for preparing the vehicle for the trip (for example, charging to a target state of charge or the pre-conditioning of the energy accumulator). Therefore, it is possible to catch up with the remaining extent of the charging, air conditioning and/or conditioning that was not fulfilled at the departure time during the run-on period.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
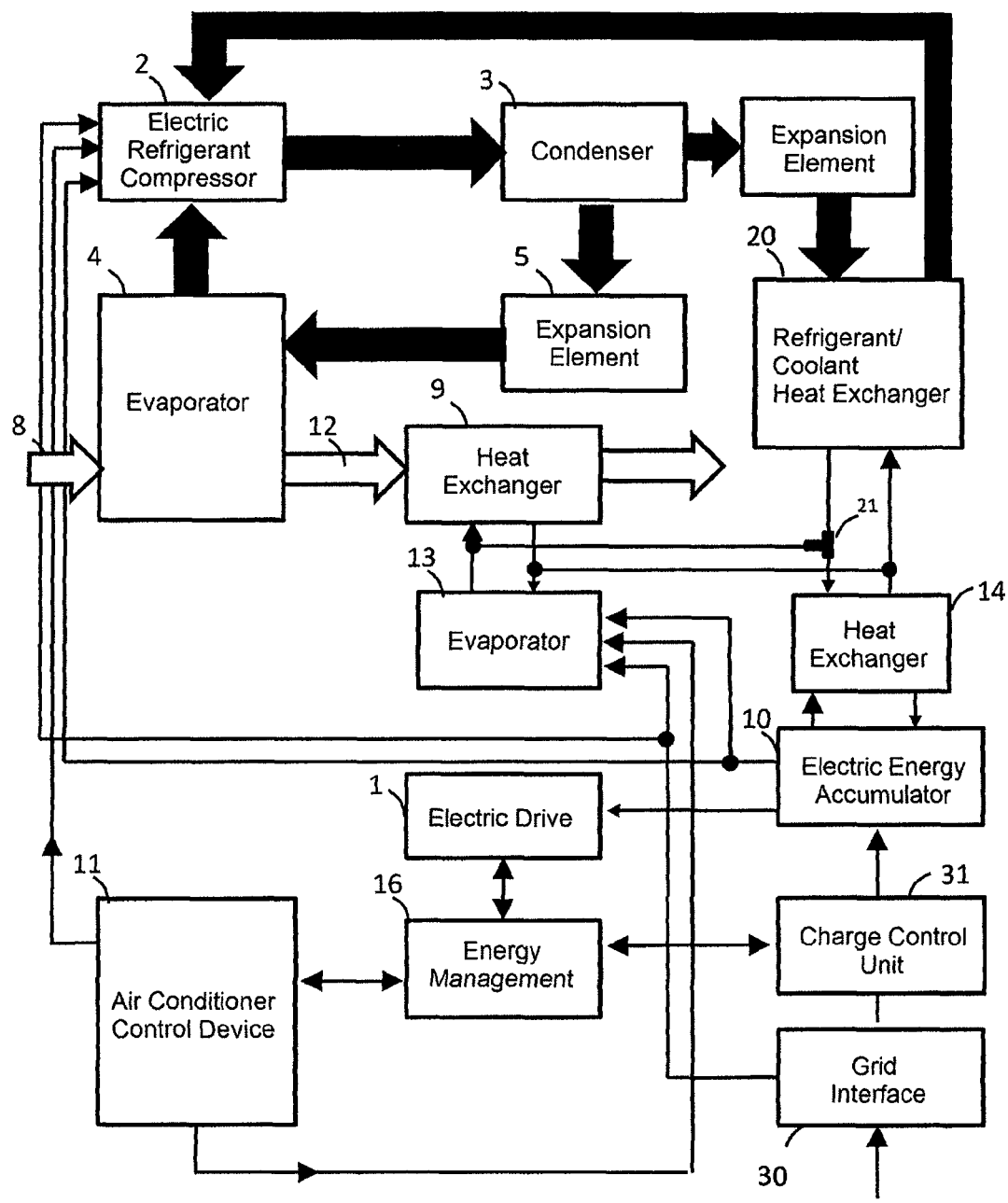
FIG. 1 is a schematic block diagram of an exemplary electric vehicle with an electric air conditioning system.

FIG. 1 shows a schematic, highly simplified block diagram of an exemplary electric vehicle with an electric air conditioning system and an electric drive 1, which is supplied with electric energy by an electric energy accumulator 10 (for example, a lithium ion battery). The air conditioning system provides a cooling function and optionally also a heating function for an electric energy accumulator 10.

The exemplary air conditioning system includes a refrigerant circuit. An electric refrigerant compressor 2 of the refrigerant circuit draws in the cold, gaseous refrigerant and compresses it. The electric refrigerant compressor 2 has an electric motor and its own compressor that is driven by the electric motor. The electric refrigerant compressor 2 is supplied with electric energy by the electric energy accumulator 10. Furthermore, a liquefier 3 (also called a condenser) is provided; and in this condenser the refrigerant gas is cooled down while at the same time dissipating thermal energy to the environment and, in so doing, is condensed. The refrigerant is evaporated in an evaporator 4 while at the same time absorbing the thermal energy from the environment. Furthermore, there is an expansion element 5, which regulates the amount of refrigerant that is received by the evaporator 4. The expansion element 5 can be designed, for example, as an expansion valve or as an expansion throttle.

An air conditioning control device 11 serves to control the refrigerant circuit. In particular, the air conditioning control device 11 serves to adjust the performance of the electric refrigerant compressor 2, in particular its motor speed.

In order to cool the vehicle interior, the fresh air or circulating air 8 is passed over the surface of the evaporator 4 and, in so doing, is cooled. In order to heat the interior, there is a heat exchanger 9, through which a coolant (for example, a mixture of water and glycol) flows; and this heat exchanger heats the air 12 that is received. The coolant is heated in an electric heater 13; and then this coolant flows through the heat exchanger 9. The electric heater 13 is supplied with electric energy by the electric energy accumulator 10. For example, the electric heater 13 can be operated with NTC [negative temperature coefficient] or PTC [positive temperature coefficient] thermistors, in order to heat a carrier medium, like air or coolant, with which the interior of a vehicle can be heated.

Furthermore, a cooling of the electric energy accumulator 10 is provided by use of a heat exchanger 14 of the energy accumulator 10; and this heat exchanger 14 is thermally coupled to the energy accumulator 10. The heat exchanger 14 takes the heat from the electric energy accumulator 10 and, in so doing, cools down the energy accumulator 10. To this end the heat exchanger 14 is coupled to the cooling circuit. The heat exchanger 14 draws the heat from the modules of the energy accumulator 10 by way of thermal conductance and dissipates this heat into the cooling medium (for example, a mixture of water and glycol). The cooling medium can be cooled down by, for example, a refrigerant/coolant heat exchanger 20, which can be integrated in parallel to the evaporator 4 of the refrigerant circuit.

Optionally a heat exchanger 14 can also be provided to heat the energy accumulator 10. A 3/2 way valve 21 can be used, for example, to perform a changeover between the refrigerant/coolant heat exchanger 20 and the electric heater 13. After the changeover to the electric heater 13, the heat exchanger 14 is supplied with thermal energy from the electric heater 13 and, in so doing, heats the energy accumulator 10.

In addition, the vehicle has a central vehicle energy management 16, which controls the consumption of electric power. For this purpose, the energy management 16 is connected to the air conditioning control device 11, the electric drive 1 and the charging control device 31.

Furthermore, the vehicle has a grid interface 30, by which the vehicle is connected to an electric power grid. When the vehicle is connected to a power grid, both the air conditioning system (in particular, the electric refrigerant compressor 2) and the electric energy accumulator 10 can be supplied with electric energy over the grid interface 30.

If the vehicle is connected to an electric power grid over the grid interface 30, this energy can be used to charge up the high voltage accumulator (HVS) 10 and to perform, prior to the departure time, a pre-air conditioning of the vehicle interior by running the air conditioning system. Since the grid power and also the duration of the grid connection are generally limited, the method according to the invention proposes a certain prioritizing for measures that can be executed prior to the time of departure (provided these measures were not deactivated by the user):

1. charge conditioning of the HVS 10: the highest priority is given to lowering the temperature of the HVS 10 to a reliable operating temperature limit (for example, 32° C.) temperature or below, if the temperature is too high.

2. charging to the minimum SOC: the second highest priority is given to reaching a minimum state of charge (minimum SOC), for example, 50% SOC.

3. pre-air conditioning of the interior: the third highest priority is given to the pre-air conditioning of the vehicle interior to a certain air conditioning state at the time of departure.

4. charging to the target SOC: the fourth highest priority is given to reaching a target state of charge (target SOC), for example, 97% SOC, with target SOC>minimum SOC.

5. pre-conditioning of the HVS 10: the fifth highest priority is given to lowering the temperature of the HVS 10 prior to the assumed departure time to such a temperature that the cooling of the energy accumulator does not have to be activated during an assumed trip. For example, the high voltage accumulator 10 is cooled down to a temperature ranging from 10° C. to 25° C., so that an upper operating temperature limit of 32° C. is not exceeded during a typical trip; above this temperature the cooling of the energy accumulator would be activated during the trip.

The prioritizing is controlled by the energy management 16.

According to the method, the energy accumulator 10 is charged up to a minimum state of charge. After the energy accumulator 10 reaches the minimum state of charge, the interior is air conditioned in such a way that a certain air conditioning state of the interior is reached at an assumed time of departure. If there is still excess energy available, this energy can be used to continue the charging of the energy accumulator 10 up to the target state of charge.

Figure 2A:
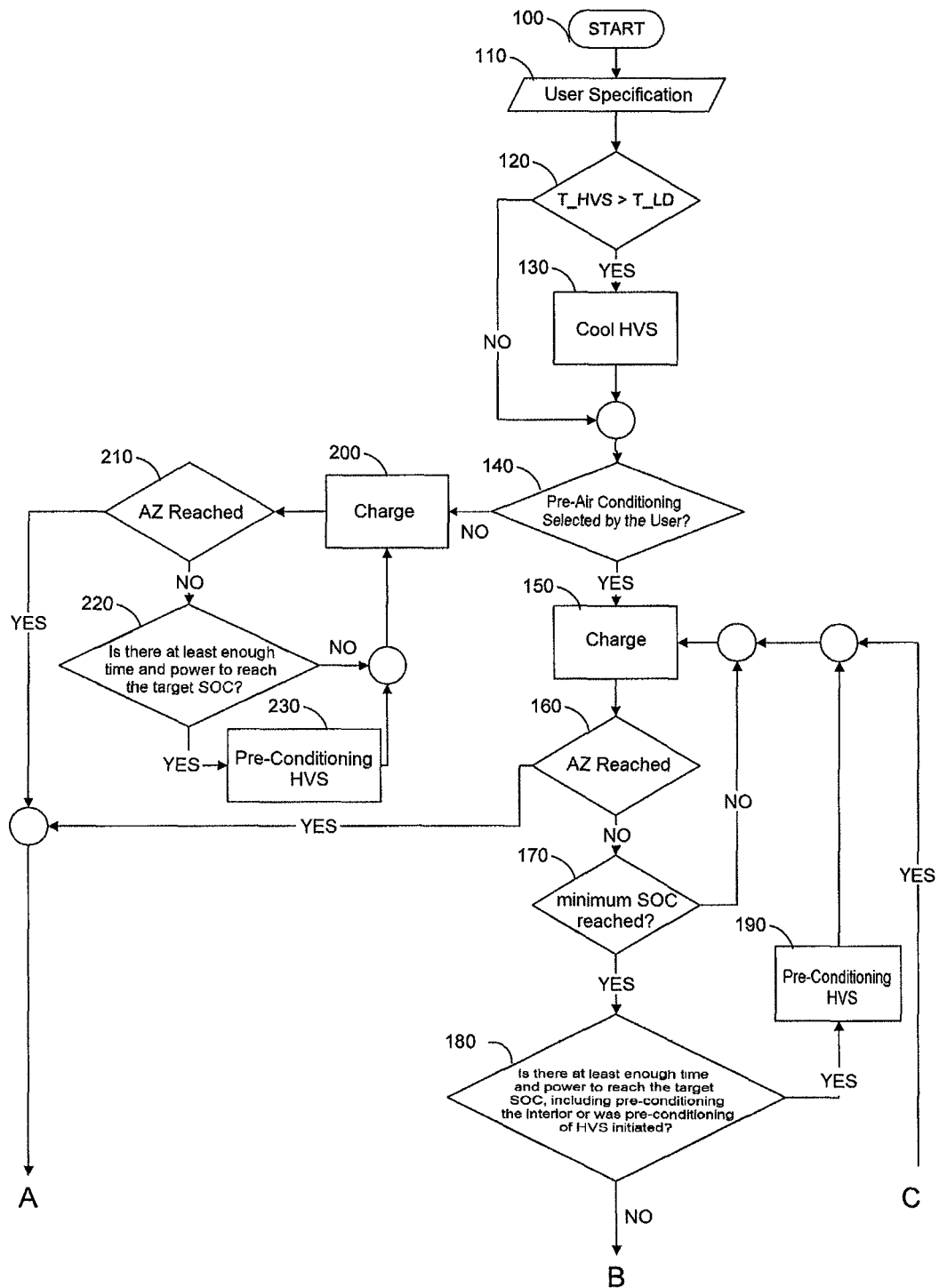
FIGS. 2a/b show exemplary embodiments of an inventive method for charging and air conditioning an electric vehicle.
Figure 2B:
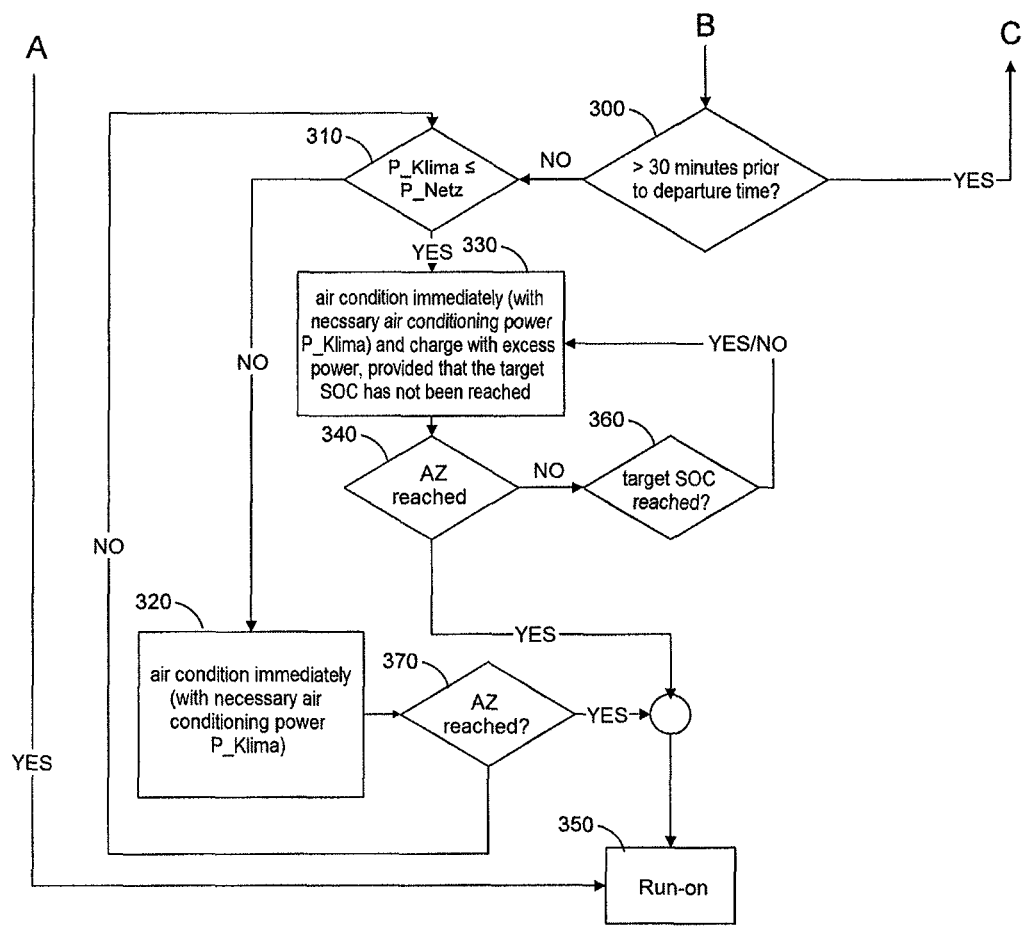

FIG. 2a and FIG. 2b show in each case a simplified exemplary embodiment of a method for charging and air conditioning the interior. The points A, B and C mark the intersections between FIG. 2a and FIG. 2b. Step 100 corresponds to the starting point of the method. In step 110 the specifications are entered by the user by way of a corresponding input possibility. For example, the user can specify:

(a) whether the vehicle shall be charged; and
(b) whether the vehicle interior shall be pre-air conditioned before the departure time (pre-air conditioning of the interior).

In addition, the user specifies the departure time in step 110.

Preferably the exemplary embodiment does not provide that the user specify whether a pre-conditioning of the high voltage accumulator 10 is desired or not. Whether the pre-conditioning is executed or not is decided by the vehicle as a function of the available energy. However, as an alternative it can also be provided that the user specify whether the high voltage accumulator 10 shall be pre-conditioned (provided that there is enough energy available).

The charge conditioning of the high voltage accumulator 10 takes place in steps 120 and 130. In addition, step 120 checks whether the temperature T_HVS of the high voltage accumulator 10 is higher than the allowable operating temperature limit T_LD (for example, T_LD=32° C.). If this is the case, then the high voltage accumulator 10 is cooled (see step 130) until T_≤HVST_LD holds true.

Step 140 checks whether the pre-air conditioning of the vehicle interior was selected by the user. If the pre-air conditioning of the vehicle interior was selected by the user, then the vehicle is charged for a defined duration in step 150. Then step 160 checks whether the departure time (AZ) has already been reached. If this is not the case, then step 170 checks whether the minimum SOC has already been reached. As long as this is not the case, the charging continues (see step 150). If finally the minimum SOC has been reached, then step 180 executes a prognosis as to whether the energy that can be retrieved over the grid interface 30 prior to the departure time is at least adequate to reach the target SOC and to carry out a pre-air conditioning of the interior. In addition, it can be forecast whether the time prior to the departure time and the grid power are at least adequate for this purpose. Only if there is enough energy will a pre-conditioning of the high voltage accumulator 10 take place (see step 190). The pre-conditioning does not have to be started immediately, but rather can also be started at a later time prior to reaching the departure time. The reason lies in the fact that reaching the target SOC and the pre-air conditioning of the interior have a higher priority than the pre-conditioning of the high voltage accumulator 10. For example, in an alternative exemplary embodiment of the method that does not support a pre-conditioning of the high voltage accumulator 10, the steps 180 and 190 must be deleted from the sequence.

If the energy for the pre-conditioning of the high voltage accumulator 10 does not suffice or a pre-conditioning according to step 190 has already been initiated beforehand, then step 300 checks (see FIG. 2b) whether the remaining time prior to the assumed departure time is longer than a time period threshold Δt of, for example, 30 minutes. The time period threshold Δt is chosen, for example, in such a way that it is at least as large as the time period prior to the departure time AZ, which is required by the air conditioning system to guarantee a desired air conditioning state at the departure time under typical environmental conditions. The time period threshold Δt can be chosen constant or can be adjusted variably as a function of one or more parameters, for example as a function of the temperature difference between the current outside and/or inside temperature and the desired inside temperature at the departure time and/or as a function of the grid power.

If the remaining time is greater than the time period threshold Δt, then the method returns again to step 150, as a result of which the charging is continued. If, however, the remaining time is less than or equal to the time period threshold, then the pre-air conditioning of the interior is started (see steps 320 and 330). At the same time the method distinguishes between two cases (see steps 320 and 330). In particular, step 310 checks whether the air conditioning power P_Klima required for air conditioning is less than or equal to an effective grid power P_Netz. The effective grid power (for example, 3.20 kW of 3.68 kW) considers the losses in the electric vehicle and is less than the power at the grid interface 30.

In the case of P_Klima≤P_Netz the air conditioning is executed with the power required to reach the air conditioning state at the time of departure (see step 330). If additional power from the grid is still available and this additional power is not needed to reach the air conditioning state at the departure time, then the excess power is used to charge the energy accumulator in the direction of the target state of charge (see step 330). Step 340 checks whether the departure time (AZ) has already been reached. If this is the case, then the method goes into a run-on phase 350, provided that the vehicle has not been started up. In a run-on phase 350, assuming that the vehicle has not been started up after the passage of an assumed departure time, the air conditioning state of the interior is maintained for a certain time period (for example, 30 minutes) following the passage of the departure time, provided that a pre-air conditioning was selected by the user. In addition, the pre-conditioning of the accumulator 10 can also be maintained for the run-on time. If step 340 determines that the departure time has not been reached, then the method checks whether the target SOC has already been reached (see step 360). Following this check, the interior continues to be air conditioned (see step 330) until finally the departure time is reached at some time. However, the energy accumulator 10 is charged only if step 360 has not determined that the target SOC has already been reached.

In the case of P_Klima>P_Netz the air conditioning is executed, nevertheless, with the power P_Klima required to reach the air conditioning state at the time of departure (see step 320). In this case, however, not only the available effective grid power P_Netz, but also the additional power P_HVS from the energy accumulator 10 is used in order to air condition the interior. At the same time the energy accumulator 10 is discharged, that is P_Klima=P_Netz+ P_HVS. Since excess grid power, required for air conditioning, is not available, the energy accumulator 10 is not charged. In the event that the power P_HVS from the energy accumulator 10 is used, it may be possible under some circumstances to fall below the minimum SOC, for example when $\Delta t=30$ minutes prior to the departure time, the minimum SOC is reached in step 170; and then the air conditioning is immediately started in step 320, using the energy from the energy accumulator 10. Therefore, the minimum SOC should be selected preferably so high that even if the energy accumulator 10 is discharged for the purpose of pre-air conditioning the interior, a lower SOC value is not undershot and is guaranteed. In this case the lower SOC value corresponds, for example, to the minimum SOC reduced by the energy consumption of the air conditioning system during the duration $\Delta t=30$ minutes. For example, it can be considered that the air conditioning system with a power consumption of 6 kW in $\Delta t=30$ minutes can consume an energy of 3 kW/h. If, for example, the energy accumulator 10 has an energy capacity of 24 kW/h, then for example, a minimum SOC of 50% can be selected, so that at a discharge by 3 kW/h owing to the air conditioning system a lower SOC of at least 37.5% is guaranteed.

Step 370 checks whether the departure time has already been reached. If this is the case, then the method goes into a run-on phase 350, provided the vehicle has not been put into service. If the departure time has not been reached, then the method goes back to step 310.

If the result of the check in step 140 (see FIG. 2a) is that a pre-air conditioning of the interior has not been selected, then in step 200 the vehicle is charged for a defined duration. Then step 210 checks whether the departure time has already been reached. If the departure time has not been reached, a prognosis is performed in step 220 as to whether the energy that can be retrieved over the grid interface 30 prior to the departure time is at least adequate to reach the target SOC. In addition, it can for example be forecast whether there is at least enough time until the departure time and enough grid power to reach the target SOC. Only if there is enough energy to reach the target SOC will the high voltage accumulator 10 be pre-conditioned (see step 230) and the accumulator 10 will be charged again (see step 200). The pre-conditioning does not have to be started immediately, but rather can be started at a later time prior to reaching the departure time. If there is not enough energy for the pre-conditioning of the high voltage accumulator 10, the accumulator 10 is charged without a pre-conditioning of the accumulator 10 (see step 200). On reaching the departure time (see prompting 210), the method goes into a run-on phase 350, provided the vehicle has not been started. In the run-on phase 350 the pre-conditioning of the accumulator can be maintained for the run-on period.

Figure 3:
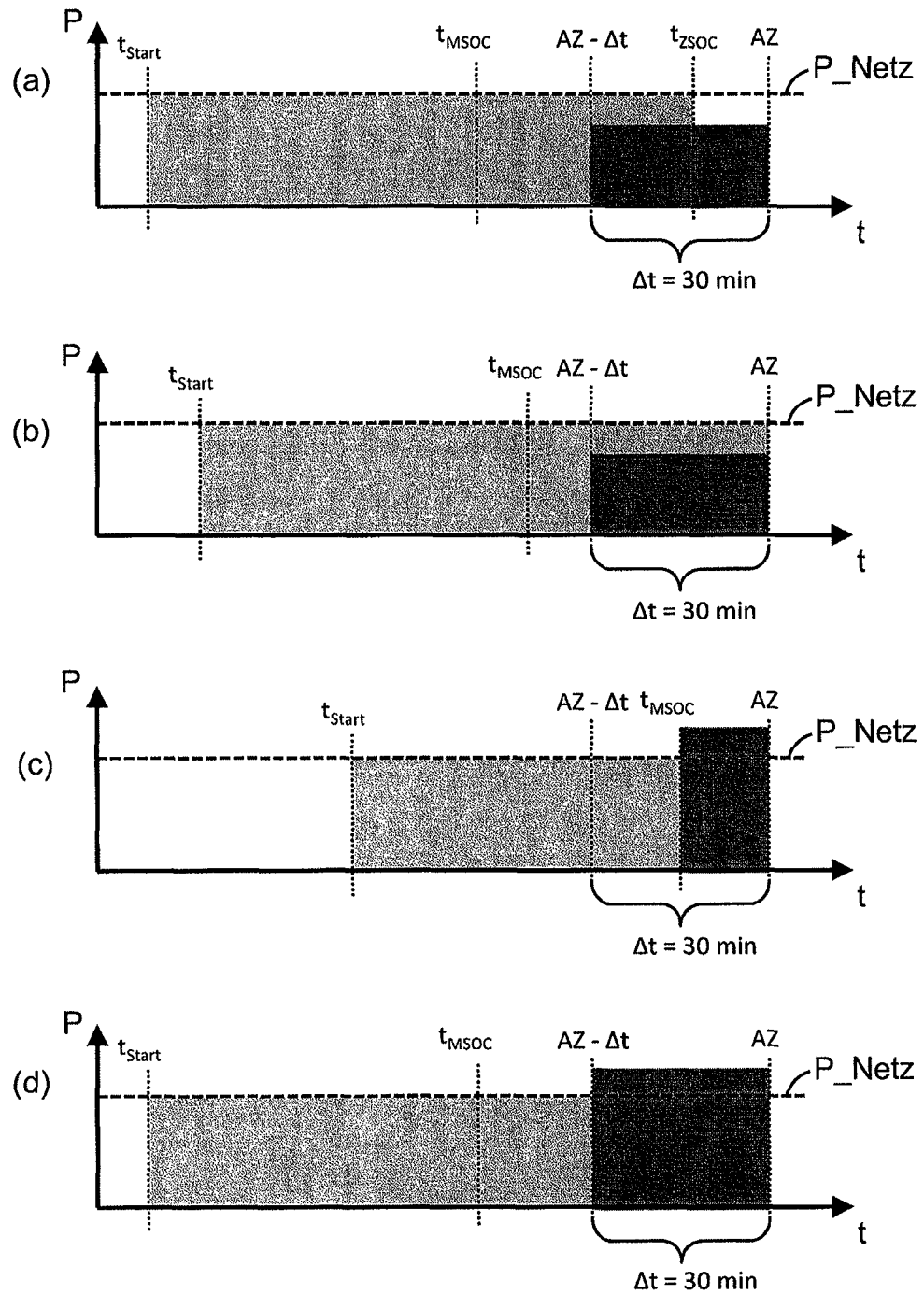
FIG. 3 shows by way of example the curve of the charging power and the corresponding charging energy and by way of example the curve of the performance of the air conditioning system and the corresponding energy consumption of the air conditioning system for three different situations (a), (b), (c) and (d).

FIG. 3 shows by way of example the curve of the charging power and the corresponding charging energy (light gray area) and an exemplary curve of the performance of the air conditioning system and the corresponding energy consumption (dark gray area) of the air conditioning system for three different situations (a), (b), (c) and (d). In the situations (a)-(c) the time period between the charging start $t_{start}$ after the electric vehicle has been connected to a charging station and the assumed departure time AZ varies in each case. It is assumed that a pre-air conditioning has been selected. The pre-conditioning of the energy accumulator 10 is not considered for reasons relating to simplification. Any run-on of the air conditioning system after the passage of the assumed departure time without a startup of the vehicle is not shown in FIG. 3.

In the charging situation (a) the duration between the charging start $t_{start}$ and the departure time AZ is long. After the electric vehicle has been connected, the charging process starts at the time $t_{start}$; and then the charging power corresponds to the effective grid power P_Netz. At the time $T_{MSOC}$ the energy accumulator 10 has reached the minimum SOC (cf. also the prompt 170 in FIG. 2a). Since, however, at this time the remaining time until the assumed departure time is longer than the time period threshold $\Delta t$ (for example, $\Delta t=30$ minutes) (see prompt 300 in FIG. 2b) and, therefore, there is still enough time to guarantee adequate air conditioning until the departure time, the charging process continues in the direction of the target SOC (see step 160). At the time AZ-$\Delta t$, which is the time period until the assumed departure time corresponds exactly to the time period threshold $\Delta t$, the air conditioning system starts to consume power for the purpose of air conditioning the interior. Since the pre-air conditioning of the interior has a higher priority than reaching the target SOC, the air conditioning system consumes as much power as necessary to guarantee the desired air conditioning state at the departure time. Only the excess fraction of the available grid power P_Netz that is not required by the air conditioning system is used for charging the energy accumulator 10. At the time $t_{ZSOC}$ the target SOC has been reached and the charging power is reduced to essentially zero. Prior to the departure time AZ the air conditioning system continues to consume the power that is needed to guarantee the desired air conditioning state at the departure time. In the ideal case $t_{ZSOC}$ and the departure time AZ coincide; or $t_{ZSOC}$ lies just on the edge of the departure time.

In the charging situation (b) the duration between the charging start $t_{start}$ and the departure time AZ is less than in the charging situation (a), because the starting point $t_{start}$ lies later in time. Consequently the time $t_{MSOC}$, at which the energy accumulator 10 has reached the minimum SOC, is also reached later. At the time AZ-$\Delta t$, which is the time period until the assumed departure time corresponds exactly to the time period threshold Δt, the air conditioning system begins to consume the necessary power for air conditioning of the interior. In parallel, the energy accumulator continues to be charged. Since the time $t_{MSOC}$, at which the energy accumulator 10 has reached the minimum SOC, was reached later, the charging energy consumed prior to the departure time AZ is no longer adequate to reach the target SOC prior to the departure time. However, the desired air conditioning state at the departure time is guaranteed.

In the charging situation (c) the duration between the charging start $t_{start}$ and the departure time AZ is even less than in the charging situation (b). There is not enough time between the charging start at the time $t_{start}$ and the time AZ-Δt to charge the energy accumulator up to the minimum SOC. Therefore, the charging process continues even after the time AZ-Δt until the minimum SOC has been reached at the time $t_{MSOC}$. The air conditioning system is not activated until the minimum SOC has been reached, because reaching the minimum SOC has a higher priority. On reaching the minimum SOC at the time $t_{MSOC}$, all of the effective grid power P_Netz is used for air conditioning. Since the time period between reaching the minimum SOC and the departure time AZ is significantly less than the time period Δt, the power demand of the air conditioning system is greater than in the situations (a) and (b) and, for example, even greater than the grid power. In order to run the air conditioning system, all of the available grid power P_Netz is used. Furthermore additional power from the energy accumulator 10 can be used for air conditioning. However, the total power consumption of the air conditioning system is typically limited. No power is used for charging, because the time period prior to the departure time AZ is significantly less than the time period Δt; and, therefore, excess energy is no longer available for charging. Depending on how long the time period AZ-$t_{MSOC}$ is, the air conditioning goal is or is not totally reached.

The situation (d) corresponds to the situation (a) with the sole difference that the grid power P_Netz is less than the required power demand P_Klima of the air conditioning system, for example, because the starting temperature is very high or very low or the available grid power is low. In the case of P_Klima>P_Netz (see prompt 310 in FIG. 2b), the air conditioning is actually executed with the necessary power demand P_Klima. The missing power for this air conditioning is provided by the energy accumulator 10 that is discharged, as a result.

FIG. 3 shows a constant power consumption of the air conditioning system during the air conditioning process. It serves to simplify the situation. In reality it is possible to use, instead of a constant power consumption, a curve, in which the power consumption drops during the air conditioning process, so that at the start of the air conditioning process the power consumption of the air conditioner is higher than just before the departure time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for charging an electric vehicle, which is coupled to an electric energy supply and comprises an electric energy accumulator, and for stationary mode air conditioning of a vehicle interior by use of an electric air conditioning system, wherein electric energy is received from the electric energy supply, the method comprising the acts of:
   charging the electric energy accumulator in response to commands from an energy management controller to a minimum state of charge;
   after the energy accumulator has reached the minimum state of charge, using the energy management controller to command the air conditioning of the vehicle interior such that at an assumed departure time, a preset air conditioning state of the interior is reached, wherein the act of air conditioning the vehicle interior includes
   determining using the energy management controller whether the electric energy being received from the electric energy supply is sufficient to achieve the preset air conditioning state of the interior by the assumed departure time,
   if the electric energy being received from the electric energy supply is determined to be insufficient to achieve the preset air conditioning state of the interior by the assumed departure time, using the energy management controller to command the supplying of energy from the energy accumulator in addition to the electric energy being received from the electric energy supply for air conditioning the vehicle interior; and
   if the electric energy being received from the electric energy supply is determined to be sufficient to achieve the preset air conditioning state of the interior by the assumed departure time, using the energy management controller to command the charging of the energy accumulator with excess energy, which is not required for reaching the preset air conditioning state.

2. The method according to claim 1, further comprising the acts of:
   after the energy accumulator has reached the minimum state of charge, checking whether at an assumed departure time, the time period has reached or dropped below a certain time period threshold,
   wherein in this case the air conditioning of the interior is started.

3. The method according to claim 1, further comprising the act of checking whether power made available by the energy supply for air conditioning the vehicle interior is adequate enough that at the assumed departure time, the air conditioning state of the interior is guaranteed.

4. The method according to claim 2, further comprising the act of checking whether power made available by the energy supply for air conditioning the vehicle interior is adequate enough that at the assumed departure time, the air conditioning state of the interior is guaranteed.

5. The method according to claim 1, further comprising the act of:
   using the energy management controller to command the charging of the electric energy accumulator to lower the temperature of the energy accumulator prior to the assumed departure time to a temperature sufficiently low that during an assumed trip no additional cooling of the energy accumulator is expected to be needed.

6. The method according to claim 2, further comprising the act of:
   using the energy management controller to command the charging of the electric energy accumulator to lower the temperature of the energy accumulator prior to the assumed departure time to a temperature sufficiently low that during an assumed trip no additional cooling of the energy accumulator is expected to be needed.

7. The method according to claim 3, further comprising the act of:

lowering the temperature of the energy accumulator prior to the assumed departure time to a temperature sufficiently low that during an assumed trip no additional cooling of the energy accumulator is expected to be needed.

8. The method according to claim 5, wherein at the assumed departure time, the temperature is less than an upper operating temperature limit, at which or above which cooling of the energy accumulator would be activated during the trip, by at least 5° C.

9. The method according to claim 8, wherein the temperature of the energy accumulator is in a range of 7° to 22°.

10. The method according to claim 1, wherein the minimum state of charge or a related state of charge is variably adjustable.

11. The method according to claim 10, wherein the minimum state of charge or the related state of charge is variably adjustable by one of user input selection and automatic vehicle adjustment by evaluating a vehicle itinerary history or as a function of information about an upcoming trip.

12. The method according to claim 1, wherein after passage of the assumed departure time without a startup of the vehicle, the vehicle interior continues to be air conditioned for a certain run-on period of time.

13. The method according to claim 2, wherein after passage of the assumed departure time without a startup of the vehicle, the vehicle interior continues to be air conditioned for a certain run-on period of time.

* * * * *